United States Patent
Tang et al.

(10) Patent No.: US 8,350,548 B2
(45) Date of Patent: Jan. 8, 2013

(54) FREQUENCY CONTROL CIRCUIT AND METHOD FOR A NON-CONSTANT FREQUENCY VOLTAGE REGULATOR

(75) Inventors: Chien-Fu Tang, Hsinchu (TW); Isaac Y Chen, Jubei (TW)

(73) Assignee: Richtek Technology Corp., Hsinchu (TW)

(*) Notice: Subject to any disclaimer, the term of this patent is extended or adjusted under 35 U.S.C. 154(b) by 239 days.

(21) Appl. No.: 12/942,224

(22) Filed: Nov. 9, 2010

(65) Prior Publication Data
US 2011/0109290 A1    May 12, 2011

(30) Foreign Application Priority Data
Nov. 11, 2009  (TW) .............................. 98138206 A

(51) Int. Cl.
  *G05F 1/575*  (2006.01)
  *G05F 1/618*  (2006.01)
(52) U.S. Cl. ...................................... 323/282; 323/285
(58) Field of Classification Search .................. 323/224, 323/271, 282, 285, 288, 351
See application file for complete search history.

(56) References Cited

U.S. PATENT DOCUMENTS
7,446,520 B2 * 11/2008 Hung ............................. 323/288
2008/0088284 A1 * 4/2008 Weng ............................. 323/271

* cited by examiner

*Primary Examiner* — Gary L Laxton
(74) *Attorney, Agent, or Firm* — Rosenberg, Klein & Lee

(57) ABSTRACT

A non-constant frequency voltage regulator includes a constant-time trigger to generate a pulse width modulation signal, a current generator to provide a first current to set a constant on-time or a constant off-time for the pulse width modulation signal, and a frequency control circuit to detect the pulse width of a phase node voltage, compare the pulse width with the constant on-time or the constant off-time set by the first current to generate a second current, and add the second current to the first current to supply to the constant-time trigger to control the frequency of the pulse width modulation signal.

10 Claims, 11 Drawing Sheets

US 8,350,548 B2

FREQUENCY CONTROL CIRCUIT AND METHOD FOR A NON-CONSTANT FREQUENCY VOLTAGE REGULATOR

FIELD OF THE INVENTION

The present invention is related generally to a non-constant frequency voltage regulator and, more particularly, to a frequency control circuit and method for a non-constant frequency voltage regulator.

BACKGROUND OF THE INVENTION

If a PWM power converter uses a non-fixed frequency system architecture, such as a constant on-time or constant off-time control system, the frequency of the PWM power converter may deviate from the designed value under different loading and cause new problems. For example, two channels on a printed circuit board (PCB) are designed to operate with a frequency difference of higher than 100 KHz therebetween, but the real operation frequencies of the two channels may quite close to each other under certain loading, thereby causing audio beating. FIG. 1 is a circuit diagram of the basic architecture for constant on-time and constant off-time PWM, and FIG. 2 is a waveform diagram thereof. Referring to FIGS. 1 and 2, a comparator 10 compares the output voltage Vout of the system with a reference voltage Vref1 to generate a comparison signal S1, and a PWM signal generator 12 generates a PWM signal S2 according to the comparison signal S1 to drive a power output stage 14 to convert an input voltage VIN into the output voltage Vout. In the PWM signal generator 12, responsive to the comparison signal S1, a constant-time trigger 16 triggers a constant on-time Ton or a constant off-time Toff, whose width is set by a current I1 provided by a current generator 18. For example, FIG. 3 is a circuit diagram of the constant-time trigger 16 for constant on-time PWM, in which the comparison signal S1 is used to control a switch SW3 and thereby determine the time point at which a capacitor C1 is to be charged, and a comparator 22 compares the capacitor voltage VC1 with a reference voltage Vref2 to generate the PWM signal S2. Once the comparison signal S1 triggers a flip-flop 20 to turn off the switch SW3, the current I1 charges the capacitor C1 and thereby the capacitor voltage VC1 increases from zero at a constant speed. When the capacitor voltage VC1 becomes as high as the reference voltage Vref2, the PWM signal S2 turns off the on-time Ton. As the current I1 is constant, the on-time Ton of the PWM signal S2 has a fixed width. In the system shown in FIG. 1, error under different loading mainly comes from three sources:
(1) The variation of the phase node voltage Vp (=V−IL×Ron) with the load current IL, where Ron is the on-resistance of the high side power switch SW1;
(2) The voltage drop (IL×RL) caused by the inductor L and the parasitic resistance RL of the PCB; and
(3) The increased frequency caused by the reduced pulse width of the phase node voltage VP resulted from the shorter deadtime time under heavy loading.

Referring to FIGS. 1 and 4, in order to avoid the power switches SW1 and SW2 turning on at the same time, the system usually inserts a preset deadtime before the power switch SW1 turned on. At heavy loading, the duty cycle is very large but the deadtime will reduce the real on-time of the power switch SW1, thereby reducing the pulse width of the phase node voltage VP. As a result, the voltage regulator increases its operating frequency.

U.S. Pat. No. 6,456,050 uses a timing control circuit to generate a timing signal in response to the duty cycle for constant off-time control; however, a fixed frequency is achievable only when the input/output voltage ratio is less than 0.5. U.S. Pat. No. 6,774,611 uses a phase locked loop (PLL) to control the duty cycle of the PWM signal and thus provide precise frequency control, but the circuit is highly complicated.

SUMMARY OF THE INVENTION

An object of the present invention is to provide a frequency control circuit and method for a non-constant frequency voltage regulator.

Another object of the present invention is to provide a circuit and method for frequency compensation to a non-constant frequency voltage regulator according to the phase node voltage of the non-constant frequency voltage regulator.

According to the present invention, a frequency control circuit for a non-constant frequency voltage regulator includes a phase detector for detecting the pulse width of a phase node voltage and a pulse comparator for comparing the pulse width with a constant on-time or a constant off-time and thereby generating a current for compensating for the operating frequency of the voltage regulator.

According to the present invention, a frequency control method for a non-constant frequency voltage regulator includes the steps of: detecting the pulse width of a phase node voltage; and comparing the pulse width with a constant on-time or a constant off-time so as to generate a current for compensating for the operating frequency of the voltage regulator.

In the present invention, the pulse width of a phase node voltage is detected in order to compensate for the operating frequency of a voltage regulator and thereby reduce frequency error resulting from the deadtime.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
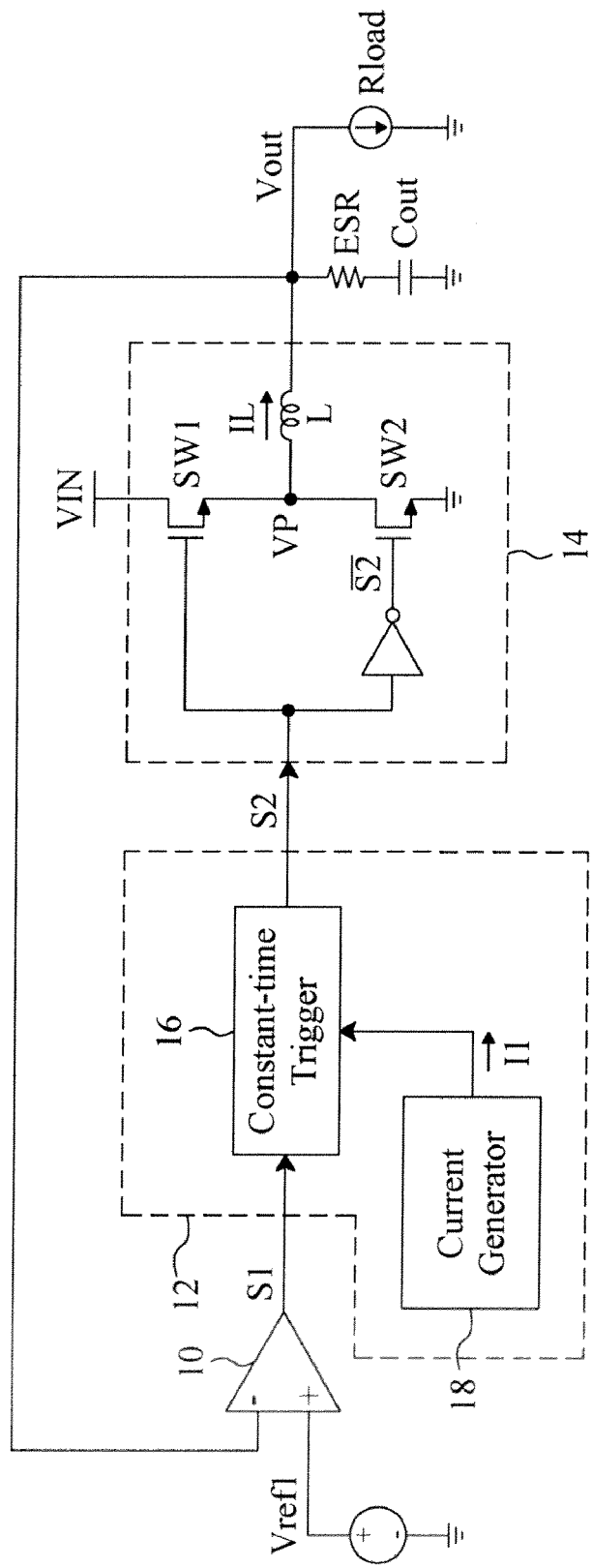
FIG. 1 is a circuit diagram of the basic architecture for constant on-time and constant off-time PWM.
Figure 2:
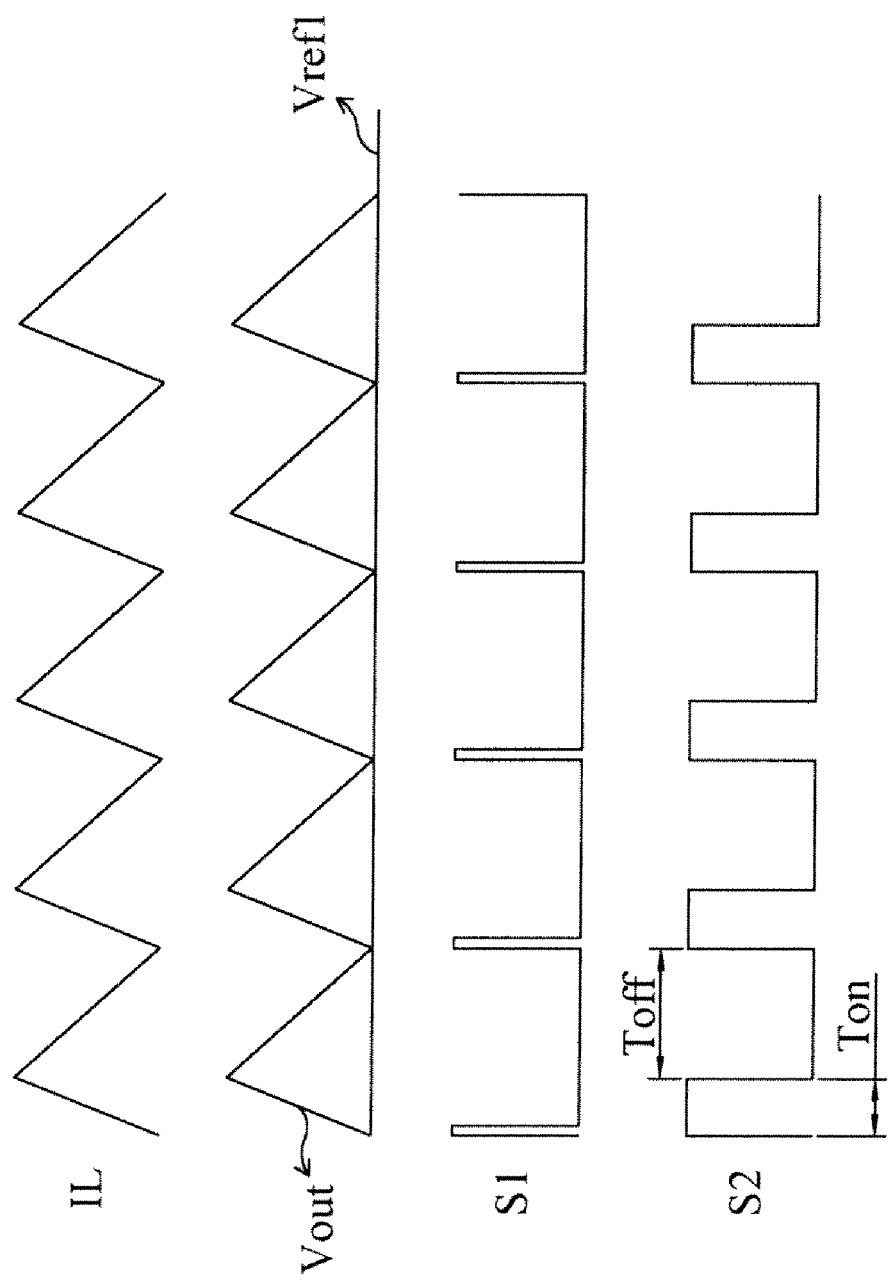
FIG. 2 is a waveform diagram of the circuit shown in FIG. 1.
Figure 3:
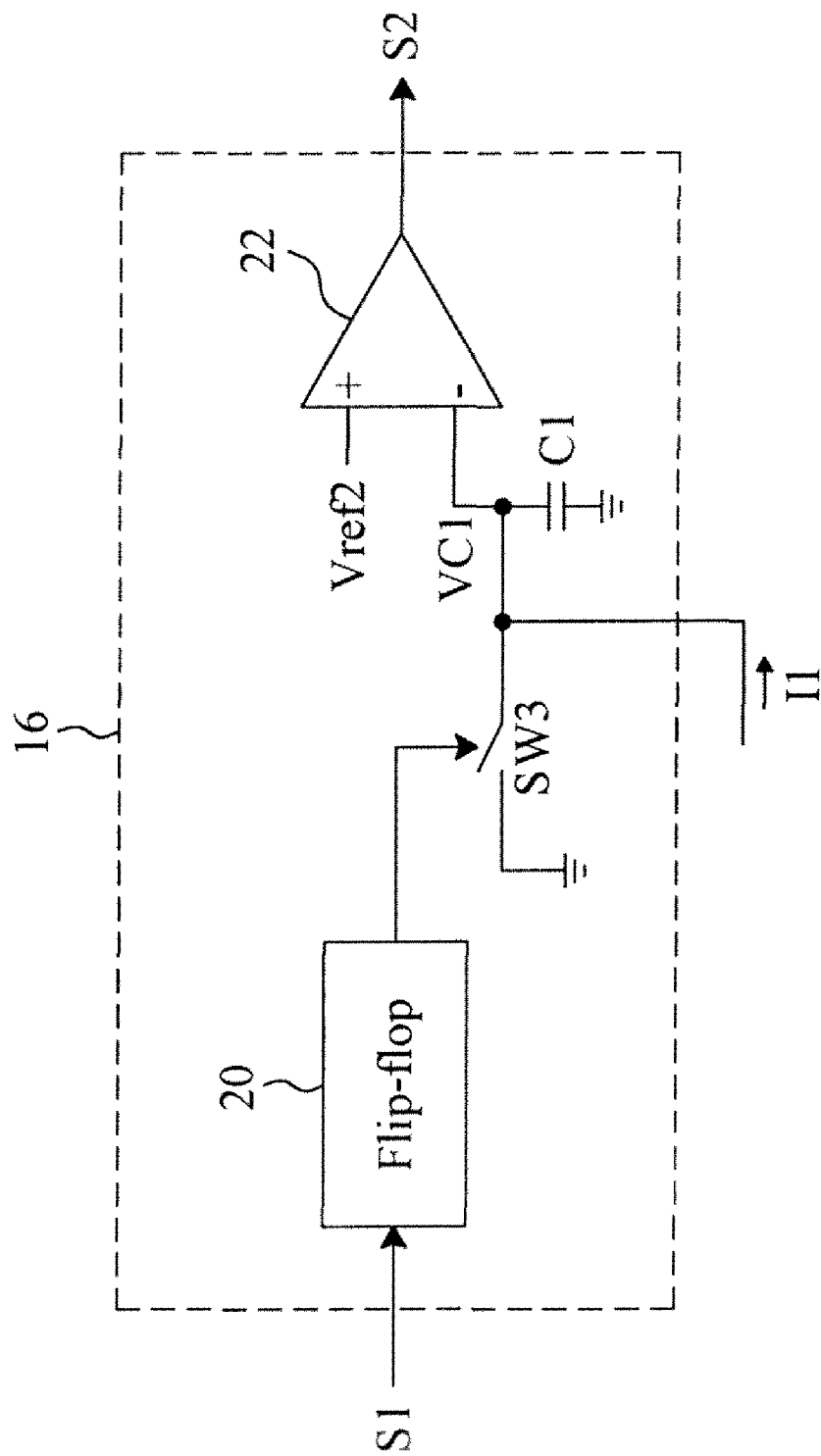
FIG. 3 is a circuit diagram of a constant-time trigger for constant on-time PWM.
Figure 4:
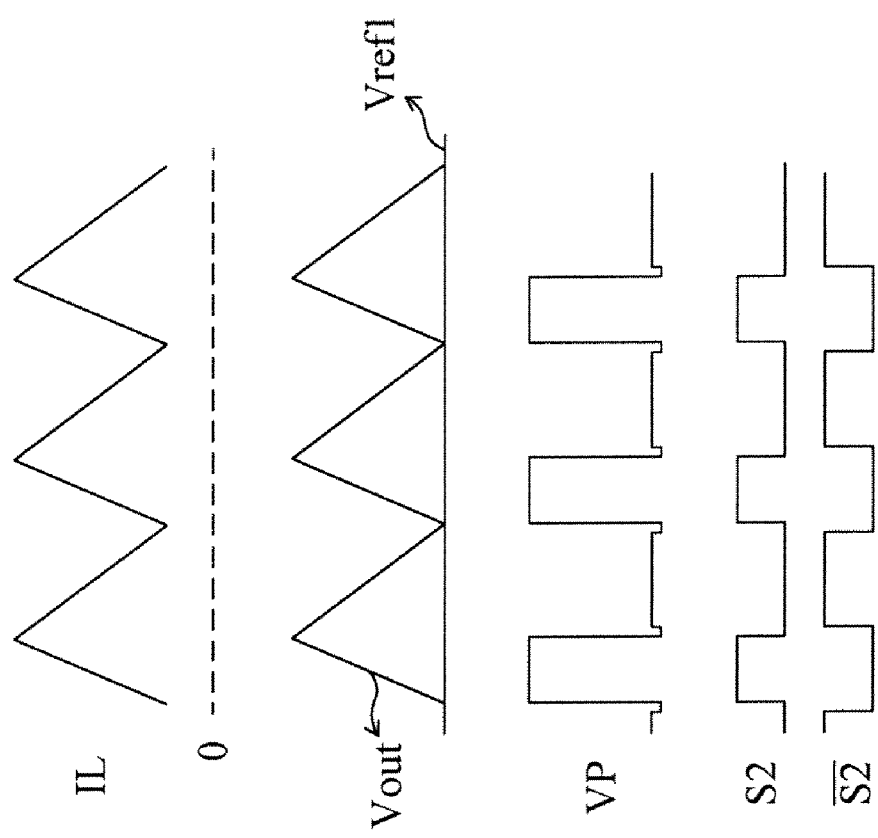
FIG. 4 is a waveform diagram of the circuit shown in FIG. 1.
Figure 5:
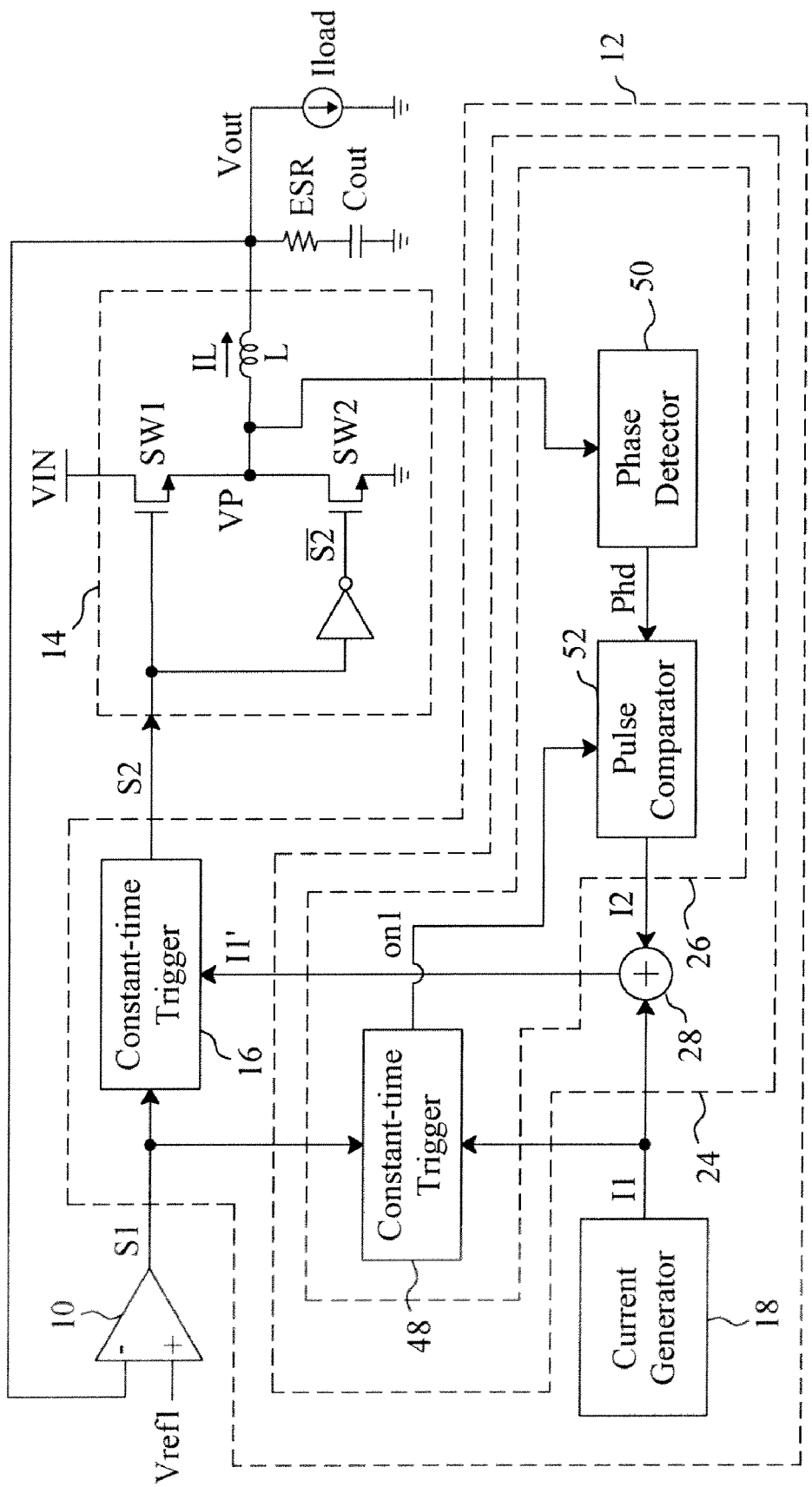
FIG. 5 is a circuit diagram of an embodiment according to the present invention.

FIG. 5 is a circuit diagram of an embodiment according to the present invention, in which the PWM signal generator 12 includes a frequency control circuit 24 in addition to the constant-time trigger 16 and the current generator 18. The frequency control circuit 24 adjusts the first current I1 supplied to the constant-time trigger 16 to be a current I1' for frequency compensation to the PWM signal S2. In the frequency control circuit 24, a compensator 26 generates a second current I2 and an adder 28 adds the second current I2 to the first current I1 to generate the current I1'. In the compensator 26, responsive to the comparison signal S1, a constant-time trigger 48 triggers a constant on-time Ton or a constant off-time Toff whose width is set by the current I1 provided by the current generator 18, just the same as the constant-time trigger 16 shown in FIG. 1, and thus the reference signal on1 generated by the constant-time trigger 48 contains the constant on-time Ton or the constant off-time Toff determined by the first current I1. The compensator 26 further includes a phase detector 50 to detect the phase node voltage VP to generate a detection signal Phd, by which the phase detector 50 uses reverse current detection technique to extract the actual on-time Ton or off-time Toff of the power switch SW1. A pulse comparator 52 compares the reference signal on1 with the detection signal Phd to extract the difference between the constant on-time Ton or the constant off-time Toff determined by the current I1 and the pulse width of the phase node voltage VP to generate the second current I2 accordingly. Namely, the second current I2 reflects the pulse width error of the phase node voltage VP and is used to adjust the on-time Ton or the off-time Toff of the PWM signal S2 to reduce the frequency error resulted from the deadtime. In constant on-time pulse width modulation, if the constant on-time Ton provided by the reference signal on1 is wider than the pulse width of the detection signal Phd, the second current I2 has a positive value, and consequently the current I1' is greater than the first current I1. As a result, the on-time Ton of the PWM signal S2 is shortened, and the frequency of the PWM signal S2 reduced.

Figure 6:
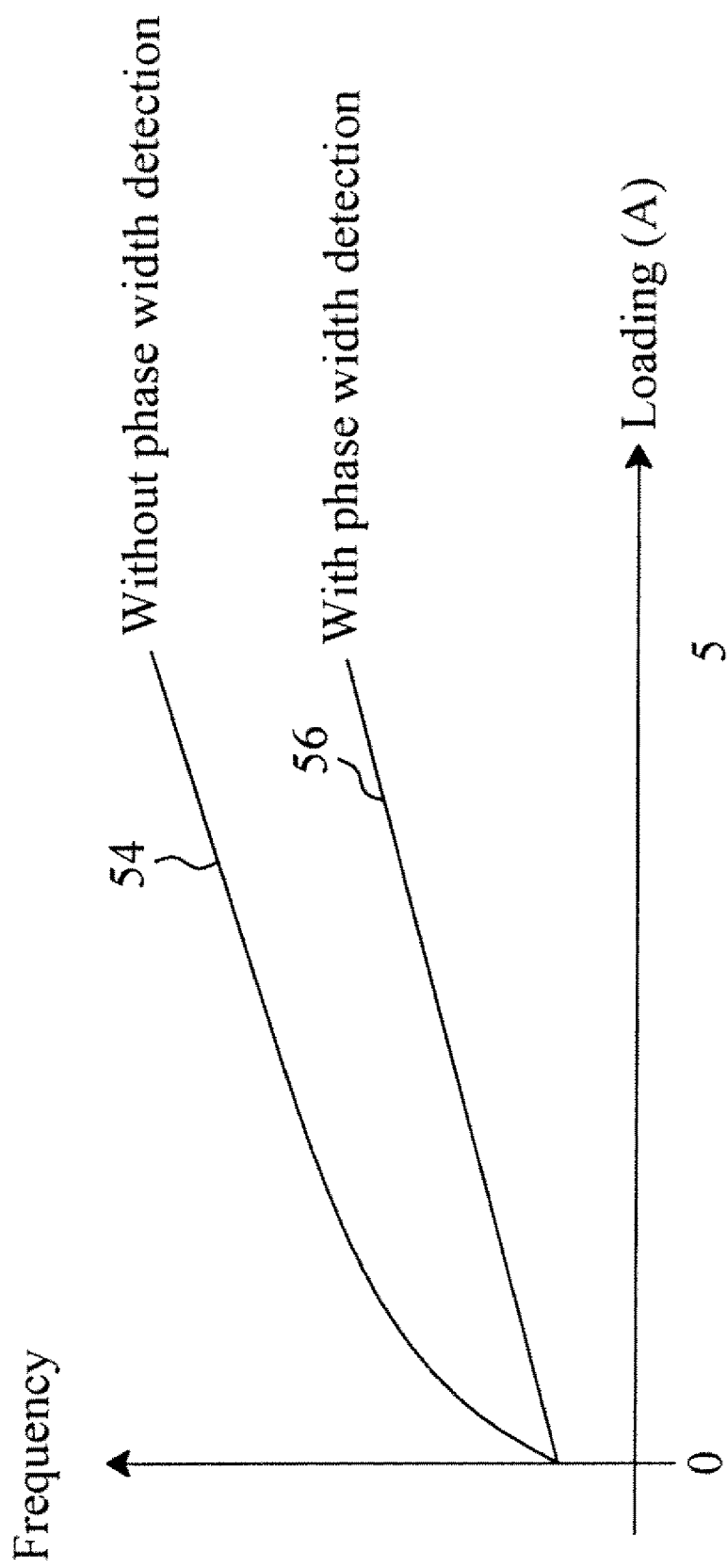
FIG. 6 is a diagram showing the curves of frequency to loading in the non-constant frequency voltage regulator of FIG. 5.

FIG. 6 is a diagram showing the curves of frequency to loading in the non-constant frequency voltage regulator of FIG. 5. As shown by the curve 54, the loading level of a conventional non-constant frequency voltage regulator has a significant impact on the operating frequency of the non-constant frequency voltage regulator. However, after frequency compensated according to the present invention, the impact of the loading level on the operating frequency is reduced, as shown by the curve 56.

Figure 7:
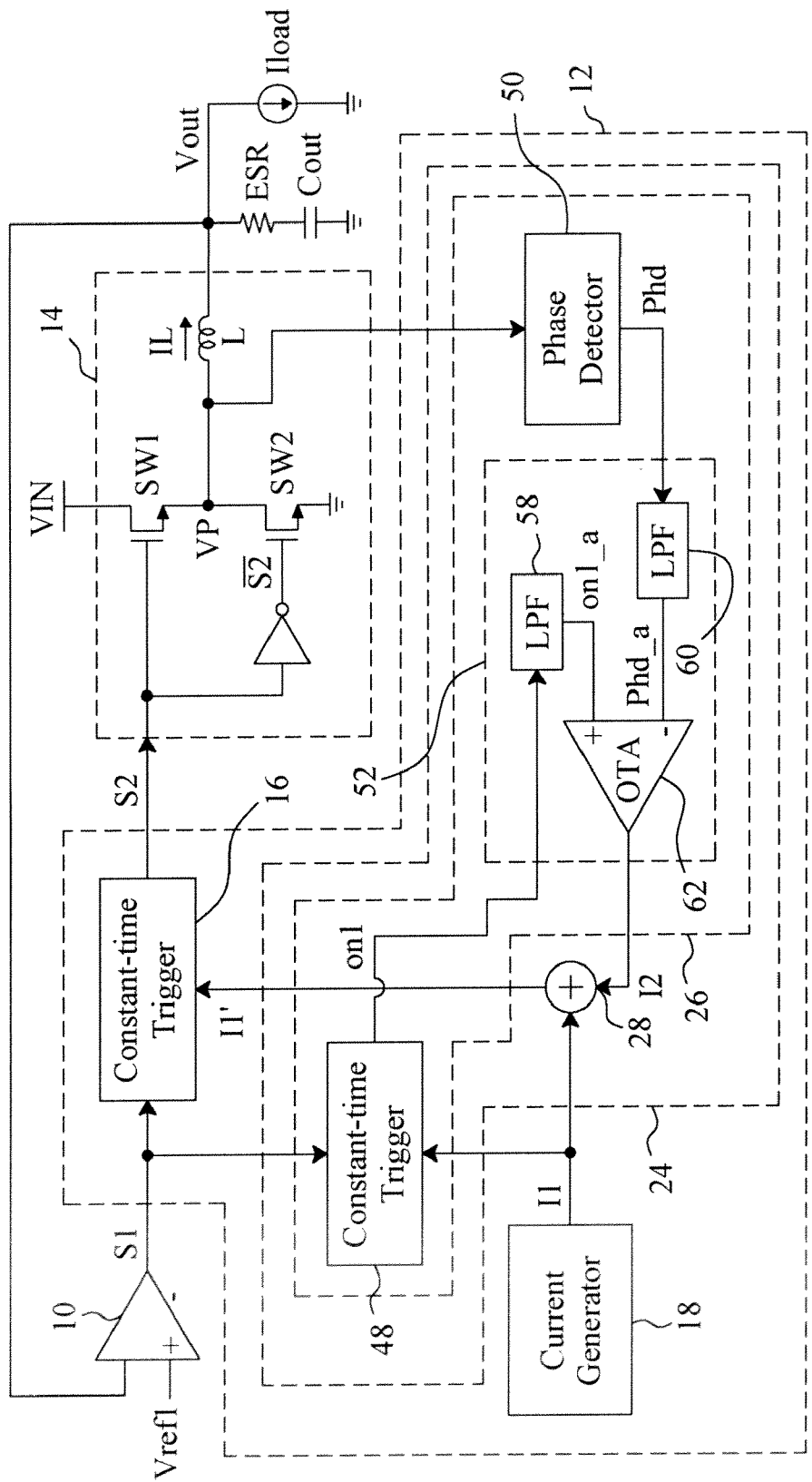
FIG. 7 is a circuit diagram of a first embodiment for the pulse comparator shown in FIG. 5.
Figure 8:
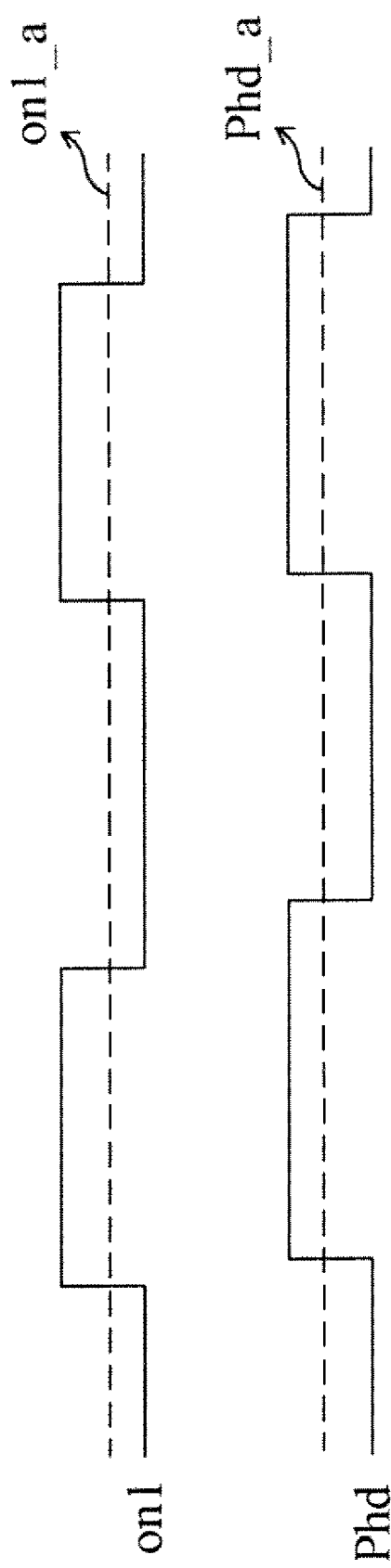
FIG. 8 is a waveform diagram of the circuit shown in FIG. 7.

There are many circuits can be used to implement the pulse comparator 52 shown in FIG. 5. For example, referring to an embodiment shown in FIG. 7 and a corresponding waveform diagram shown in FIG. 8, a low-pass filter 58 filters the reference signal on1 to extract the average value on1_a thereof, a low-pass filter 60 filters the detection signal Phd to extract the average value Phd_a thereof, and the differential voltage between the two average values on1_a and Phd_a is converted into the second current I2 by an operational transconductance amplifier 62.

Figure 9:
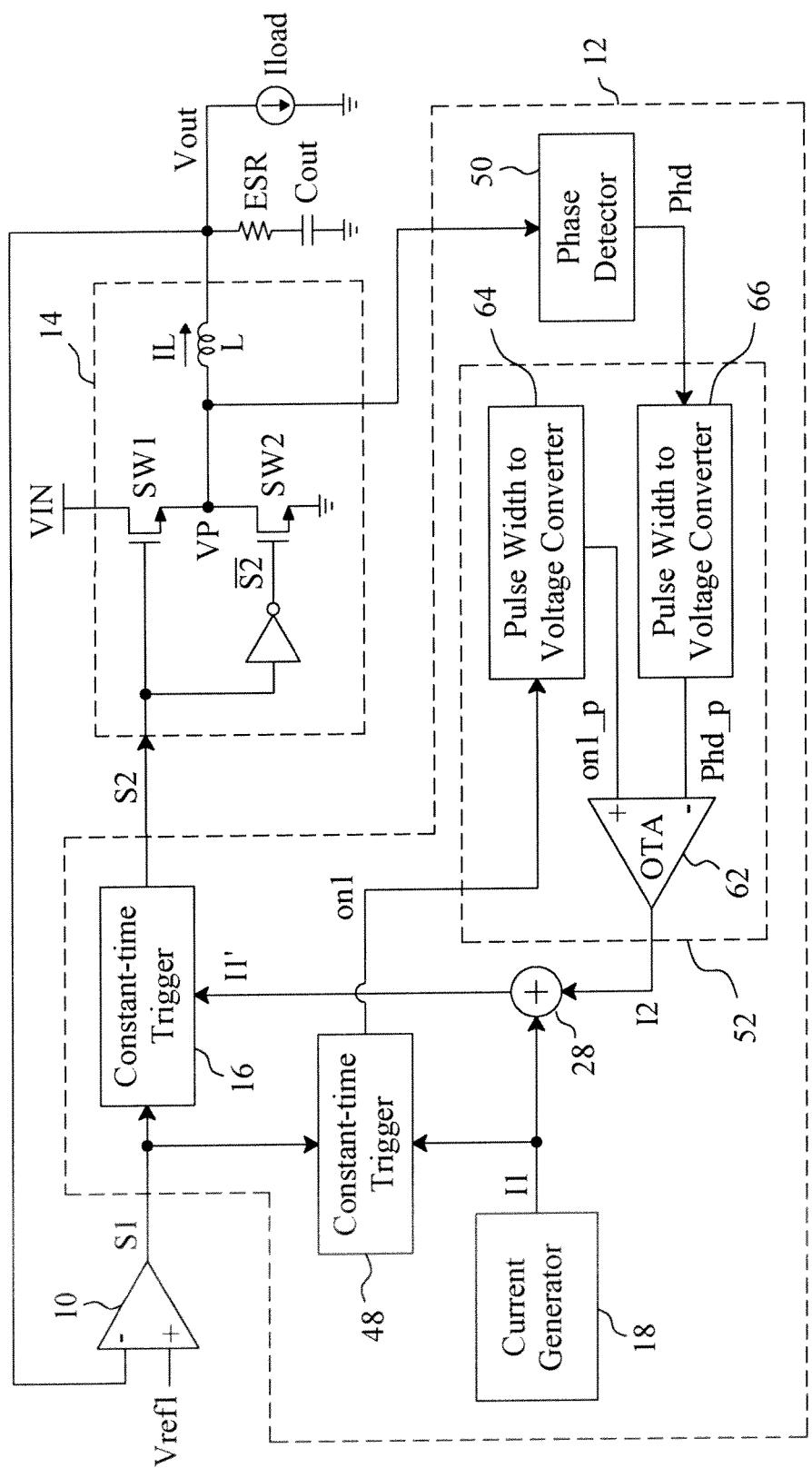
FIG. 9 is a circuit diagram of a second embodiment for the pulse comparator shown in FIG. 5.

FIG. 9 is a circuit diagram of another embodiment for the pulse comparator 52 shown in FIG. 5, which uses pulse width to voltage converters 64 and 66 to convert the pulse widths of the reference signal on1 and the detection signal Phd into voltages on1_p and Phd_p respectively, and an operational transconductance amplifier 62 to convert the differential voltage between the voltages on1_p and Phd_p into the second current I2.

Figure 10:
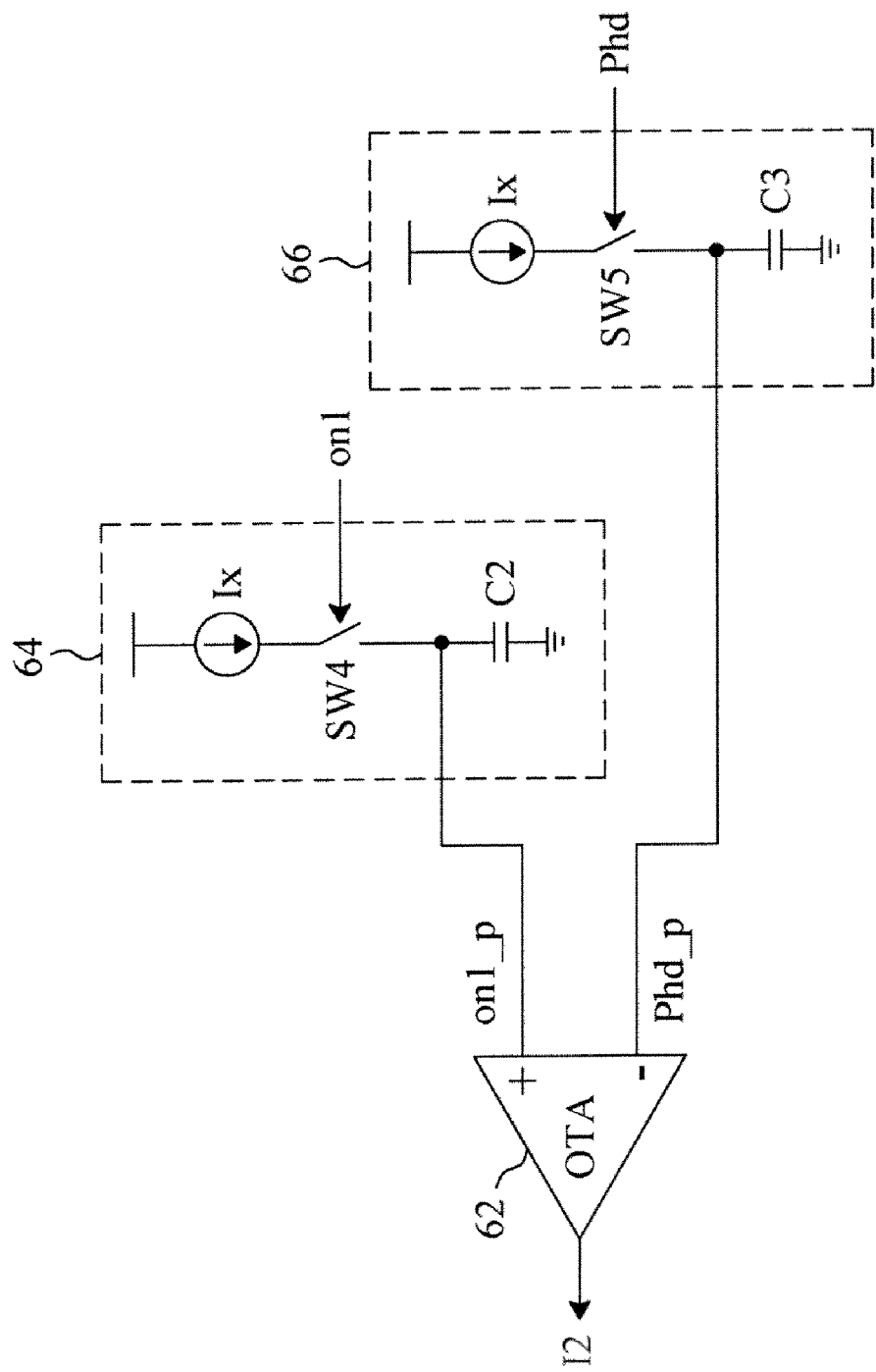
FIG. 10 is a circuit diagram of an embodiment for the pulse width to voltage converters shown in FIG. 9.
Figure 11:
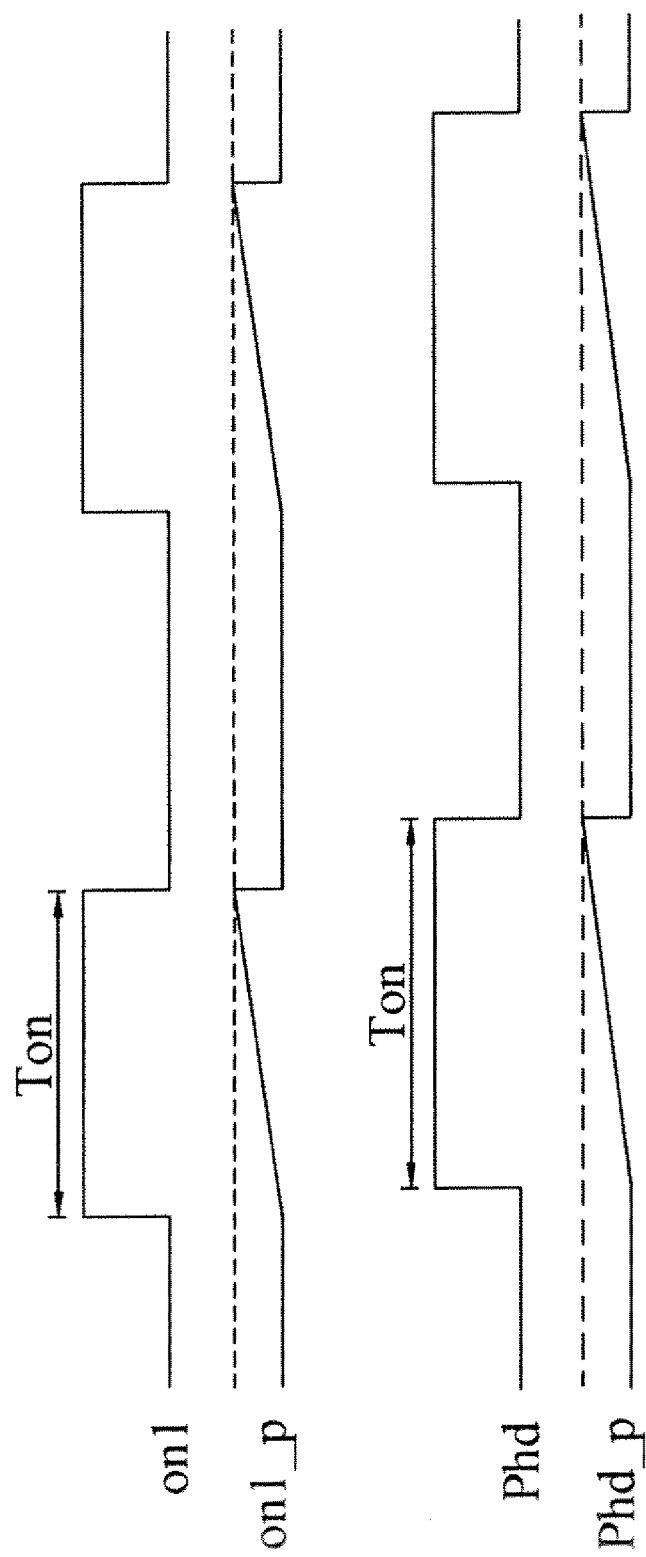
FIG. 11 is a waveform diagram of the circuit shown in FIG. 10.

FIG. 10 is a circuit diagram of an embodiment for the pulse width to voltage converters 64 and 66 shown in FIG. 9, in which the pulse width to voltage converter 64 includes a capacitor C2, a current source Ix, and a switch SW4 connected between the current source Ix and the capacitor C2 and is controlled by the reference signal on1, and the pulse width to voltage converter 66 includes a capacitor C3, a current source Ix, and a switch SW5 connected between the current source Ix and the capacitor C3 and is controlled by the detection signal Phd. FIG. 11 is a waveform diagram of the circuit shown in FIG. 10. Referring to FIGS. 10 and 11, during the on-time Ton of the reference signal on1, the switch SW4 is closed and thus allows the current source Ix to charge the capacitor C2, thereby increasing the voltage on1_p at a constant speed, and once the on-time Ton of the reference signal on1 ends, the switch SW4 is opened. On the other hand, during the on-time Ton of the detection signal Phd, the switch SW5 is closed and thus allows the current source Ix to charge the capacitor C3, and once the on-time Ton of the detection signal Phd ends, the switch SW5 is opened.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A frequency control circuit for a non-constant frequency voltage regulator including a first constant-time trigger to generate a pulse width modulation signal, a current generator to provide a first current to determine a constant on-time or a constant off-time for the pulse width modulation signal, and a power output stage operated by the pulse width modulation signal to generate a load current and having a power switch connected to a phase node to be switched by the pulse width modulation signal, the frequency control circuit comprising:
   a compensator connected to the phase node, for converting a difference between a pulse width of a phase node voltage detected from the phase node and the constant on-time or the constant off-time set by the first current into a second current; and
   an adder connected to the current generator, the first constant-time trigger, and the compensator, for adding the second current to the first current to supply to the first constant-time trigger to determine the on-time or the off-time of the pulse width modulation signal to control a frequency of the pulse width modulation signal.

2. The frequency control circuit of claim, wherein the compensator comprises:
   a second constant-time trigger connected to the current generator and the first constant-time trigger, for generating a reference signal having the constant on-time or the constant off-time set by the first current;
   a phase detector connected to the phase node, for detecting the phase node voltage to generate a detection signal; and
   a pulse comparator connected to the second constant-time trigger and the phase detector, for comparing the detection signal with the reference signal to generate the second current.

3. The frequency control circuit of claim 2, wherein the pulse comparator comprises:

a first low-pass filter connected to the second constant-time trigger, for extracting an average value of the reference signal;

a second low-pass filter connected to the phase detector, for extracting an average value of the detection signal; and an operational transconductance amplifier connected to the first and second low-pass filters, for converting a difference between the two average values into the second current.

4. The frequency control circuit of claim 2, wherein the pulse comparator comprises:

a first pulse width to voltage converter connected to the second constant-time trigger, for extracting the constant on-time or the constant off-time from the reference signal to generating a first voltage;

a second pulse width to voltage converter connected to the phase detector, for extracting the pulse width of the phase node voltage from the detection signal to generate a second voltage; and an operational transconductance amplifier connected to the first and second pulse width to voltage converters, for converting a difference between the first and second voltages into the second current.

5. The frequency control circuit of claim 4, wherein the first pulse width to voltage converter comprises:

a current source;

a capacitor; and a switch connected between the current source and the capacitor, switched by the reference signal for the current source to charge the capacitor to generate the first voltage.

6. The frequency control circuit of claim 4, wherein the second pulse width to voltage converter comprises:

a current source;

a capacitor; and a switch connected between the current source and the capacitor, switched by the detection signal for the current source to charge the capacitor to generate the second voltage.

7. A frequency control method for a non-constant frequency voltage regulator including a first constant-time trigger to generate a pulse width modulation signal, a current generator to provide a first current to determine a constant on-time or a constant off-time for the pulse width modulation signal, and a power output stage operated by the pulse width modulation signal to generate a load current and having a power switch connected to a phase node to be switched by the pulse width modulation signal, the frequency control method comprising the steps of:

(A) converting a difference between a pulse width of a phase node voltage detected from the phase node and the constant on-time or the constant off-time set by the first current into a second current; and (B) adding the second current to the first current to supply to the first constant-time trigger to determine the on-time or the off-time of the pulse width modulation signal to control a frequency of the pulse width modulation signal.

8. The frequency control method of claim 7, wherein the step A comprises the steps of:

generating a reference signal having the constant on-time or the constant off-time set by the first current;

detecting the phase node voltage to generate a detection signal; and comparing the detection signal with the reference signal to generate the second current.

9. The frequency control method of claim 8, wherein the step of comparing the detection signal with the reference signal to generate the second current comprises the steps of:

extracting an average value of the reference signal;

extracting an average value of the detection signal; and converting a difference between the two average values into the second current.

10. The frequency control method of claim 8, wherein the step of comparing the detection signal with the reference signal to generate the second current comprises the steps of:

extracting the constant on-time or the constant off-time from the reference signal to generate a first voltage;

extracting the pulse width of the phase node voltage from the detection signal to generate a second voltage; and converting a difference between the first and second voltages into the second current.

* * * * *